US012615379B2

(12) United States Patent
Ciccarelli et al.

(10) Patent No.: US 12,615,379 B2

(45) Date of Patent: *Apr. 28, 2026

(54) EMBEDDING DATA WITHIN TRANSFORMED COEFFICIENTS USING BIT PARTITIONING OPERATIONS

(71) Applicant: V-NOVA INTERNATIONAL LIMITED, London (GB)

(72) Inventors: Lorenzo Ciccarelli, London (GB); Simone Ferrara, London (GB); Guido Meardi, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 3 days.

This patent is subject to a terminal disclaimer.

(21) Appl. No.: 18/739,998

(22) Filed: Jun. 11, 2024

(65) Prior Publication Data

US 2025/0016333 A1 Jan. 9, 2025

Related U.S. Application Data

(63) Continuation of application No. 17/770,114, filed as application No. PCT/GB2020/052693 on Oct. 23, 2020, now Pat. No. 12,010,329.

(Continued)

(30) Foreign Application Priority Data

| Oct. 25, 2019 | (GB) | ................................... | 1915553.0 |
| Jan. 12, 2020 | (GB) | ................................... | 2000430.5 |
| Jan. 31, 2020 | (GB) | ................................... | 2001408.0 |

(51) Int. Cl.

| *H04N 19/162* | (2014.01) |
| *H04N 19/12* | (2014.01) |

(Continued)

(52) U.S. Cl.
CPC ........... *H04N 19/162* (2014.11); *H04N 19/12* (2014.11); *H04N 19/124* (2014.11); *H04N 19/13* (2014.11);
(Continued)

(58) Field of Classification Search
CPC ...... H04N 19/12; H04N 19/124; H04N 19/13; H04N 19/154; H04N 19/162;
(Continued)

(56) References Cited

U.S. PATENT DOCUMENTS

| 2002/0080878 A1 | 6/2002 | Li |
| 2009/0070587 A1 | 3/2009 | Srinivasan |

(Continued)

OTHER PUBLICATIONS

Wenyi Wang: "Hiding Depth Map in JPEG Image and MPEG-2 Video", Sep. 1, 2011 (Sep. 1, 2011), pp. 1-85, XP055019256 (hereinafter Wang).*

(Continued)

*Primary Examiner* — Shahan Ur Rahaman

(74) *Attorney, Agent, or Firm* — Workman Nydegger

(57) ABSTRACT

Examples described herein relate to decoding and encoding signals. Certain examples described herein encapsulate custom data that is not signal data within a stream of encoded signal data. The custom data may comprise a wide variety of metadata that annotates the signal data, or provides additional information relating to the signal data. Certain examples described herein encapsulate custom data within a set of transformed coefficient values that represent data derived from a transform operation that forms part of the signal encoding. The encapsulation may be performed by applying a bit shift operation to coefficient bits representing the set of transformed coefficient values.

17 Claims, 6 Drawing Sheets

Related U.S. Application Data

(60) Provisional application No. 62/984,261, filed on Mar. 2, 2020.

(51) Int. Cl.

| | |
|---|---|
| *H04N 19/124* | (2014.01) |
| *H04N 19/13* | (2014.01) |
| *H04N 19/154* | (2014.01) |
| *H04N 19/176* | (2014.01) |
| *H04N 19/18* | (2014.01) |
| *H04N 19/184* | (2014.01) |
| *H04N 19/33* | (2014.01) |
| *H04N 19/34* | (2014.01) |
| *H04N 19/463* | (2014.01) |
| *H04N 19/60* | (2014.01) |
| *H04N 19/88* | (2014.01) |

(52) U.S. Cl.

CPC ......... *H04N 19/154* (2014.11); *H04N 19/176* (2014.11); *H04N 19/18* (2014.11); *H04N 19/184* (2014.11); *H04N 19/33* (2014.11); *H04N 19/34* (2014.11); *H04N 19/463* (2014.11); *H04N 19/60* (2014.11); *H04N 19/88* (2014.11)

(58) Field of Classification Search

CPC .... H04N 19/176; H04N 19/18; H04N 19/184; H04N 19/33; H04N 19/34; H04N 19/463; H04N 19/467; H04N 19/48; H04N 19/60; H04N 19/88

See application file for complete search history.

(56) References Cited

U.S. PATENT DOCUMENTS

| | | | | |
|---|---|---|---|---|
| 2010/0061447 A1 | | 3/2010 | Tu | |
| 2012/0293620 A1* | | 11/2012 | Pahalawatta | ........... H04N 19/33 |
| | | | | 348/43 |
| 2018/0376156 A1* | | 12/2018 | Deshpande | ........ H04N 21/2353 |

OTHER PUBLICATIONS

Working Draft of Low Complexity Enhancement Video Coding; TD-GEN-0406, ITU-T Draft; Study Period 2017-2020; Study Group 16; Series TD-GEN-0406, International Telecommunication Union, Geneva; CH, vol. ties/16, retrieved Oct. 3, 2019(Oct. 3, 2019).*

Swati S, Hayat K, Shahid Z. A watermarking scheme for High Efficiency Video Coding (HEVC). PLoS One. Aug. 21, 2014;9(8): e105613. doi: 10.1371/journal.pone.0105613. PMID: 25144455; PMCID: PMC4140792.*

International Search Report and Written Opinion for PCT/GB2020/052693 mailed Jan. 25, 2021.

Video: "Working Draft of Low Complexity Enhancement Video Coding; TD-GEN-0406", ITU-T Draft; Study Period 2017-2020; Study Group 16; Series TD-GEN-0406, International Telecommunication Union, Geneva; CH, vol. ties/16, Oct. 3, 2019(Oct. 3, 2019), pp. 1-85, XP044276392, Retrieved from the Internet: https://www.itu.int/ifa/t/2017/sg16/docs/191007/td/ties/gen/T17-SG16-191007-TD-GEN-0406!A1!MSW-E.docx [retrieved on Oct. 3, 2019].

Wenyi Wang: "Hiding Depth Map in JPEG Image and MPEG-2 Video", Sep. 1, 2011 (Sep. 1, 2011), pp. 1-85, XP055019256, retrieved from the Internet: http://www.ruor.uottawa.ca/en/bitstream/handle/10393/20360/Wang_Wenyi_2011_thesis.pdf?sequence=5 [retrieved on Feb. 13, 2012].

Simone Ferrara et al: "[LCEVC]—Technical improvements to LCEVC", 128. MPEG Meeting; Oct. 7, 2019-Oct. 11, 2019; Geneva; (Motion Picture Expert Group or ISO/IEC JTC1/SC29/WG11), No. m50999, Oct. 2, 2019 (Oct. 2, 2019), XP030221502, retrieved from the Internet: http://phenix.intevry.fr/mpeg/doc_end_user/documents/128_Geneva/wg11/m50999-v1-m50999-%5BLCEVC%5DProposedimprovementstoLCEVC-v.1.zip, m50999—[LCEVC]—Proposed improvements to LCEVC-v.1.docx [retrieved on Oct. 2, 2019].

Simone Ferrara (Mailto: Walt Husak): "AHG on Low Complexity Enhancement Video Coding", 128. Mpeg Meeting; Oct. 7, 2019-Oct. 11, 2019; Geneva; (Motion Picture Expert Group or ISO/IEC JTC1/SC29/WG11), No. m49930, Oct. 7, 2019 (Oct. 7, 2019), XP030220883, retrieved from the Internet: http://phenix.intevry.fr/mpeg/doc_end_user/documents/128_Geneva/wg11/m49930-v1-m49930-LCEVCAHGReport.zip, m49930-LCEVC AHG Report.docx [retrieved on Oct. 7, 2019].

Maurer F et al: "[LCEVC] Input Data Experiment Results", 129. Mpeg Meeting; Jan. 13, 2020-Jan. 17, 2020; Brussels; (Motion Picture Expert Group or ISO/IEC JTC1/SC29/WG11), No. m52267, Jan. 12, 2020 (Jan. 12, 2020), XP030224864, retrieved from the Internet: http://phenix.int-evry.fr/mpeg/doc_end_user/documents/129_Brussels/wg11/m52267-v2-m52267-%5BLCEVC%5DUserDataExperimentResult-v.1.zip, m52267—[LCEVC] User Data Experiment Result—v.1.docx [retrieved on Jan. 12, 2020].

* cited by examiner

C # N
C # N+1
C # N+2
C # N+3
C # N+4
C # N+5

470

472

Inverse Quantise &
Inverse Transform

Shift

EMBEDDING DATA WITHIN TRANSFORMED COEFFICIENTS USING BIT PARTITIONING OPERATIONS

CROSS-REFERENCE TO RELATED APPLICATIONS

The present application is a continuation of U.S. patent application Ser. No. 17/770,114, filed Apr. 19, 2022, which is a 371 US National Stage Entry of PCT/GB2020/052693, filed on Oct. 23, 2020, which claims priority to U.S. Provisional Patent Application No. 62/984,261, filed Mar. 2, 2020. PCT/GB2020/052693 also claims priority to UK Patent Application Nos. 1915553.0, filed Oct. 25, 2019, 2000430.5, filed Jan. 12, 2020, and 2001408.0, filed Jan. 31, 2020. The entire disclosures of the aforementioned applications are incorporated herein by reference.

TECHNICAL FIELD

The present invention relates to methods for processing signals, such as by way of non-limiting examples video, images, hyperspectral images, audio, point clouds, 3 DoF/6 DoF (Degrees of Freedom) and volumetric signals. Processing data may include, but is not limited to, obtaining, deriving, encoding, outputting, receiving, decoding and reconstructing a signal. The present invention relates to the embedding of data within an encoded bitstream by modifying bit values for a set of transformed coefficients.

BACKGROUND

Many signal coding approaches use a transform operation to transform blocks of signal data. For example, many image, video and audio encoding methods utilise a discrete cosine transform (DCT) to express a finite sequence of data points in terms of a sum of cosine functions oscillating at different frequencies. A standardised DCT operation used in video coding compresses 8 by 8 blocks of frame data to generate an encoded data stream. At a decoder, this encoded data stream may be decoded by applying an inverse version of the DCT. An integer DCT is used in the AVC (Advanced Video Coding) standard and the HEVC (High Efficiency Video Coding) standards, and other DCT implementations are found in MP3 audio coding and digital television coding schemes.

Tier-based coding formats, such as ISO/IEC MPEG-5 Part 2 LCEVC (hereafter "LCEVC"), or SMPTE VC-6 2117 (hereafter "VC-6"), also apply a transform to residual data to generate different "echelons" or "hierarchical tiers" of data. In this case, multiple transform operations may be applied, e.g. one transform operation for each of the echelons or tiers, where each echelon or tier corresponds to a different level of quality. Levels of quality may correspond to different sampling rates and/or spatial resolutions.

One challenge with signal coding schemes is how to communicate metadata that is associated with an encoded signal. For example, metadata may comprise additional information about the signal, where is it desired that the metadata is received with the signal so that it may be used in reconstruction operations. In certain applications, it may be desired to tag certain parts of a signal, such as different frames of audio or video data. With image encoding (whether static or video), it may also be desired to tag certain areas within a particular image, such as information associated with entities that appear in the image. For example, these may be object identifiers, hyperlinks, object properties, face identifiers etc.

Several solutions for metadata coding introduce additional side-channels or data streams to carry the metadata. For example, several video coding standards use supplemental enhancement information (SEI) messages to carry metadata streams in addition to Network Abstraction Layer (NAL) units that carry the encoded video stream. The general set of NAL units for an encoded video stream may be split into Video Coding Layer (VCL) units and non-VCL units, the latter being available to carry non-video data such as SEI messages or other parameter sets.

Another solution to carry metadata is to use digital watermarking technologies. One example digital watermarking technology is the Advanced Television Systems Committee (ATSC) Video Watermark Emission Standard-A/335. The document defining this standard, e.g. as published on 20 Sep. 2016, is incorporated by reference herein. In A/335, the top one or two lines of a video signal are used to embed watermarking information. In A/335, the luma values of pixels within these lines are modified to carry watermarking information. A receiver extracts the first one or two lines of each frame of a video signal and applies a set of thresholding operations to recover the encoded data.

One issue with A/335 and similar digital watermarking approaches is that they require the embedded data to survive various compression and transcoding operations, as well as delivery over legacy consumer High-Definition Multimedia Interface (HDMI) interfaces. To achieve robustness more complex thresholding operations are applied at the receiver. A/335 is also not intended to be tamper-resistant or indelible; it may be deliberately obliterated by an intermediary.

In general, it is desired to have methods and systems for the efficient communication of custom or user (i.e. non-signal) data with signal data. It is desired that methods and systems minimise changes to existing signal coding approaches yet provide flexible and addressable additional data streams.

BRIEF DESCRIPTION OF THE DRAWINGS

FIGS. 4A to 4C are schematic diagrams showing an example process of user data extraction.

DETAILED DESCRIPTION

Figure 1:
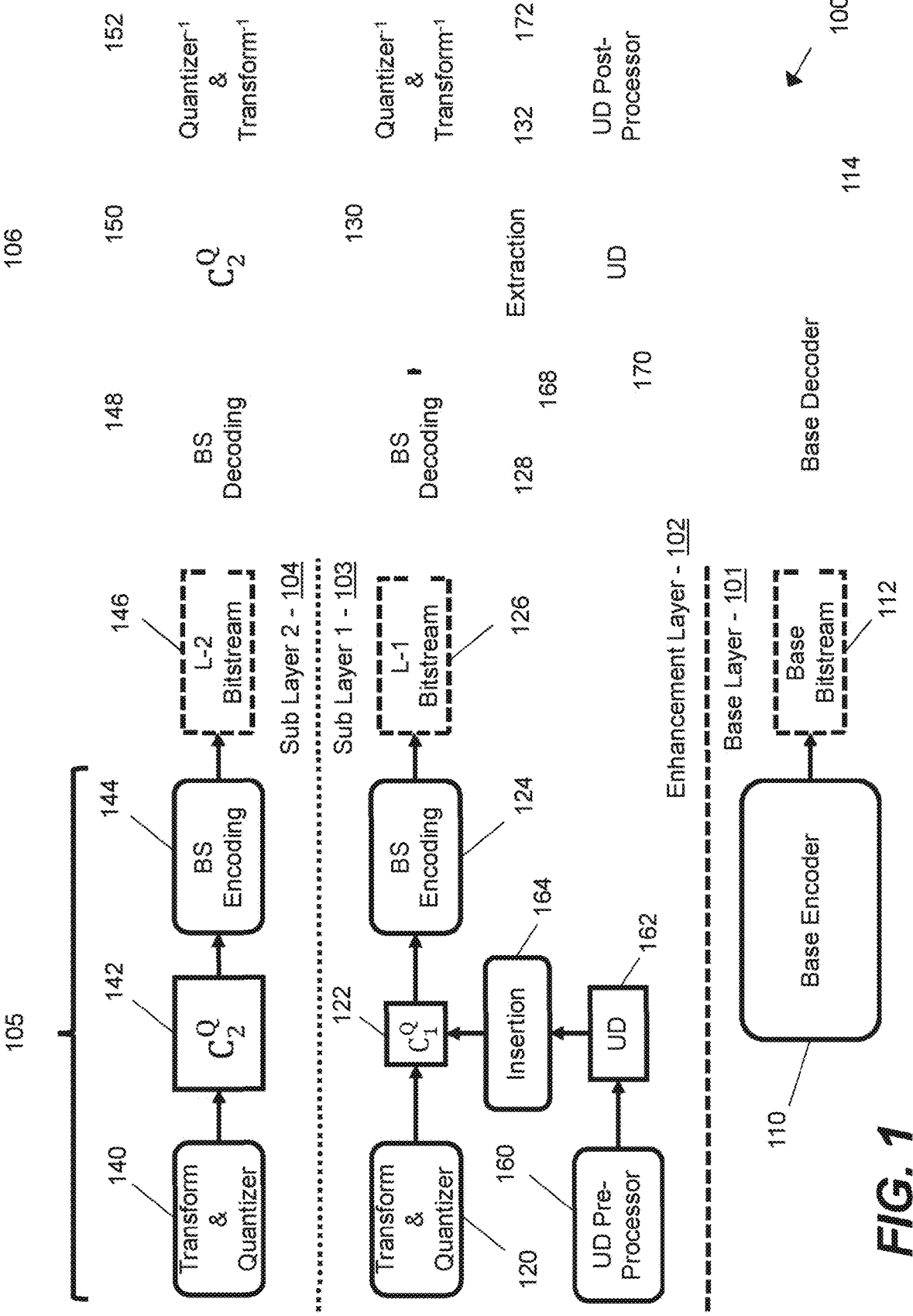
FIG. 1 is a block diagram showing an example signal coding system.

Certain examples described herein encapsulate custom data that is not signal data within a stream of encoded signal data. The custom data may comprise a wide variety of metadata that annotates the signal data, or provides additional information relating to the signal data. If the signal data comprises a video or audio stream, then the custom data may comprise within-stream annotations or tags, that identify persons or objects that feature in the stream. Certain examples described herein encapsulate custom data within a set of transformed coefficient values that represent data derived from a transform operation that forms part of the signal encoding.

In particular examples described herein, at the encoder, a bit shift operation is applied to bits representing the transformed coefficient values and userdata bits are inserted into the new shifted-in bits. At the decoder, the userdata bits may be read out before a further bit shift operation is applied to shift the bits representing the transformed coefficient values back to their original location. Although the bit shift operation has the potential to modify the transformed coefficient values, as it only changes bit values at one end of a bit sequence representing a transformed coefficient value, an approximation to the original transformed coefficient value may be reconstructed that has been found to have a reduced visual impact on a reconstructed signal. Moreover, if the user data encapsulation is performed within a tier-based hierarchy that has multiple residual data streams, a higher level residual data stream may correct for any subtle modifications to a current level residual data stream, thus still allowing for the option of lossless encoding. The bit shift operation may be rapidly applied (e.g. in parallel) to multiple transformed coefficient values that make up a particular plane of signal data both during encoding and decoding, minimising the processing overhead of the user data insertion and extraction processes. Also, by having the size of the shift and user data as a configurable parameter, different levels of data embedding may be provided. The present examples may further be implemented as optional modifications to existing signal coding technologies without modifying the core coding operations of those technologies.

The present description relates to "signal" coding. As non-limiting examples, a signal can be an image, an audio signal, a multi-channel audio signal, a telemetry signal, a video signal, a 3 DoF/6 DoF video signal, a volumetric signal (e.g., medical imaging, scientific imaging, holographic imaging, etc.), a volumetric video signal, or even signals with more than four dimensions.

Examples are presented herein with reference to a signal as a sequence of samples (i.e., two-dimensional images, video frames, video fields, sound frames, etc.). For simplicity, non-limiting embodiments illustrated herein often refer to signals that are displayed as 2D planes of settings (e.g., 2D images in a suitable colour space), such as for instance a video signal. The terms "picture", "frame" or "field" will be used interchangeably with the term "image", so as to indicate a sample in time of the video signal: any concepts and methods illustrated for video signals made of frames (progressive video signals) can be easily applicable also to video signals made of fields (interlaced video signals), and vice versa. Despite the focus of embodiments illustrated herein on image and video signals, people skilled in the art can easily understand that the same concepts and methods are also applicable to any other types of multidimensional signal (e.g., audio signals, volumetric signals, stereoscopic video signals, 3 DoF/6 DoF video signals, plenoptic signals, point clouds, etc.). Although image or video coding examples are provided, the same approaches may be applied to signals with dimensions fewer than two (e.g., audio or sensor streams) or greater than two (e.g., volumetric signals).

In the description the terms "image", "picture" or "plane" (intended with the broadest meaning of "hyperplane", i.e., array of elements with any number of dimensions and a given sampling grid) will be often used to identify the digital rendition of a sample of the signal along the sequence of samples, wherein each plane has a given resolution for each of its dimensions (e.g., X and Y), and comprises a set of plane elements (or "element", or "pel", or display element for two-dimensional images often called "pixel", for volumetric images often called "voxel", etc.) characterized by one or more "values" or "settings" (e.g., by ways of non-limiting examples, colour settings in a suitable colour space, settings indicating density levels, settings indicating temperature levels, settings indicating audio pitch, settings indicating amplitude, settings indicating depth, settings indicating alpha channel transparency level, etc.). Each plane element is identified by a suitable set of coordinates, indicating the integer positions of said element in the sampling grid of the image. Signal dimensions can include only spatial dimensions (e.g., in the case of an image) or also a time dimension (e.g., in the case of a signal evolving over time, such as a video signal).

The term "interface" is used herein to refer to any physical and/or logical interface that allows for one or more of data input and data output. An interface may be implemented by retrieving data from one or more memory locations, as implemented by a processor executing a set of instructions. An interface may also comprise physical couplings over which data is received. An interface may comprise an application programming interface and/or method call or return. For example, in a software implementation an interface may comprise passing data and/or memory references to a function initiated via a method call; in a hardware implementation, an interface may comprise a wired interconnect between different chip, chipsets or portions of chips. In the Figures, an interface may be indicated by a boundary of a processing block that has an inward and/or outward arrow representing a data transfer.

FIG. 1 shows an example signal coding system 100. The signal coding system 100 is a multi-layer or tier-based coding system, in that a signal is encoded via a plurality of bitstreams that each represent different encodings of the signal at different levels of quality. In the example of FIG. 1, there is a base layer 101 and an enhancement layer 102. The enhancement layer 102 may implement an enhancement coding scheme such as LCEVC. LCEVC is described in PCT/GB2020/050695, and the associated standard specification documents including the Draft Text of ISO/IEC DIS 23094-2 Low Complexity Enhancement Video Coding published at MPEG 129 meeting in Brussels, held Monday, 13 Jan. 2020 to Friday, 17 Jan. 2020. Both of these documents are incorporated herein by reference. In FIG. 1, the enhancement layer 101 comprises two sub-layers: a first sub-layer 103 and a second sub-layer 104. Each layer and sub-layer may be associated with a specific level of quality. Level of quality as used herein may refer to one or more of: sampling rate, spatial resolution, and bit depth, amongst others. In LCEVC, the base layer 101 is at a base level of quality, the first sub-layer 103 is at a first level of quality and the second sub-layer 104 is at a second level of quality. The base level of quality and the first level of quality may comprise a common (i.e. shared or same) level of quality or different levels of quality. In a case where the levels of quality correspond to different spatial resolutions, such as in LCEVC, inputs for each level of quality may be obtained by downsampling and/or upsampling from another level of quality. For example, the first level of quality may be at a first spatial resolution and the second level of quality may be at a second, higher spatial resolution, where signals may be converted between the levels of quality by downsampling from the second level of quality to the first level of quality and by upsampling from the first level of quality to the second level of quality.

Although, examples are presented herein as implemented within a multi-layer or tier-based coding system, in other examples there may be a single layer of encoding at a single level of quality. For example, the person skilled in the art will be aware that only the middle, first sub-layer 103 may be implemented, e.g. with a DCT transform and non-residual data, and still provide the technical benefits of the invention that are described herein. As such, the approaches described herein with reference to the components of the first sub-layer 103 may be implemented within different single layer encoding and decoding pipelines.

In FIG. 1, corresponding encoder 105 and decoder 106 portions of the signal coding system 100 are illustrated. It will be noted that the encoder 105 and the decoder 106 may be implemented as separate products and that these need not originate from the same manufacturer or be provided as a single combined unit. The encoder 105 and decoder 106 are typically implemented in different geographic locations, such that an encoded data stream is generated in order to communicate an input signal between said two locations. Each of the encoder 105 and the decoder 106 may be implemented as part of one or more codecs-hardware and/or software entities able to encode and decode signals. Reference to communication of signals as described herein also covers encoding and decoding of files, wherein the communication may be within time on a common machine (e.g., by generating an encoded file and accessing it at a later point in time) or via physical transportation on a medium between two devices.

In certain preferred implementations, the components of the base layer 101 may be supplied separately to the components of the enhancement layer 102; for example, the base layer 101 may be implemented by hardware-accelerated codecs whereas the enhancement layer 102 may comprise a software-implemented enhancement codec. The base layer 101 comprises a base encoder 110. The base encoder 110 receives a version of an input signal to be encoded, for example a signal following one or two rounds of downsampling and generates a base bitstream 112. The base bitstream 112 is communicated between the encoder 105 and decoder 106. At the decoder 106, a base decoder 114 decodes the base bitstream 112 to generate a reconstruction of the input signal at the base level of quality.

Both enhancement sub-layers 103 and 104 comprise a common set of encoding and decoding components. The first sub-layer 103 comprises a first sub-layer transformation and quantisation component 120 that outputs a set of first sub-layer transformed coefficients 122. The first sub-layer transformation and quantisation component 120 receives data derived from the input signal at the first level of quality and applies a transform operation. This data may comprise residual data as described later below. The first sub-layer transformation and quantisation component 120 may also apply a variable level of quantisation to an output of the transform operation (including being configured to apply no quantisation). The set of first sub-layer transformed coefficients 122 are encoded by a first sub-layer bitstream encoding component 124 to generate a first sub-layer bitstream 126. This first sub-layer bitstream 126 is communicated from the encoder 105 to the decoder 106. At the decoder 106, the first sub-layer bitstream 126 is received and decoded by a first sub-layer bitstream decoder 128 to obtain a decoded set of first sub-layer transformed coefficients 130. The decoded set of first sub-layer transformed coefficients 130 are passed to a first sub-layer inverse transformation and inverse quantisation component 132. The first sub-layer inverse transformation and inverse quantisation component 132 applies further decoding operations including applying at least an inverse transform operation to the decoded set of first sub-layer transformed coefficients 130. If quantisation has been applied by the encoder 105, the first sub-layer inverse transformation and inverse quantisation component 132 may apply an inverse quantisation operation prior to the inverse transformation. The further decoding is used to generate a reconstruction of the input signal.

In a similar manner, the second sub-layer 104 also comprises a second sub-layer transformation and quantisation component 140 that outputs a set of second sub-layer transformed coefficients 142. The second sub-layer transformation and quantisation component 140 receives data derived from the input signal at the second level of quality and applies a transform operation. This data may also comprise residual data in certain embodiments, although this may be different residual data from that received by the first sub-layer 103. The transform operation may be the same transform operation that is applied at the first sub-layer 103. The second sub-layer transformation and quantisation component 140 may also apply a variable level of quantisation before the transform operation (including being configured to apply no quantisation). The set of second sub-layer transformed coefficients 142 are encoded by a second sub-layer bitstream encoding component 144 to generate a second sub-layer bitstream 146. This second sub-layer bitstream 146 is communicated from the encoder 105 to the decoder 106. In one case, at least the first and second sub-layer bitstreams 126 and 146 may be multiplexed into a single encoded data stream. In one case, all three bitstreams 112, 126 and 146 may be multiplexed into a single encoded data stream. The single encoded data stream may be received at the decoder 106 and de-multiplexed to obtain each individual bitstream.

At the decoder 106, the second sub-layer bitstream 146 is received and decoded by a second sub-layer bitstream decoder 148 to obtain a decoded set of second sub-layer transformed coefficients 150. As above, the decoding here relates to a bitstream decoding and may form part of a decoding pipeline (i.e. the decoded set of transformed coefficients 130 and 150 may represent a partially decoded set of values that are further decoded by further operations). The decoded set of second sub-layer transformed coefficients 150 are passed to a second sub-layer inverse transformation and inverse quantisation component 152. The second sub-layer inverse transformation and inverse quantisation component 152 applies further decoding operations including applying at least an inverse transform operation to the decoded set of second sub-layer transformed coefficients 150. If quantisation has been applied by the encoder 105 at the second sub-layer, the inverse second sub-layer transformation and inverse quantisation component 152 may apply an inverse quantisation operation prior to the inverse transformation. The further decoding is used to generate a reconstruction of the input signal.

The bitstream encoding components 124 and 144 may implement a configurable combination of one or more of entropy encoding and run-length encoding. Likewise, the bitstream decoding components 128 and 148 may implement a configurable combination of one or more of entropy encoding and run-length decoding.

Further details and examples of a two sub-layer enhancement encoding and decoding system may be obtained from published LCEVC documentation.

In general, examples described herein operate within encoding and decoding pipelines that comprises at least a transform operation. The transform operation may comprise the DCT or a variation of the DCT, a Fast Fourier Transform (FFT), or a Hadamard transform as implemented by LCEVC. The transform operation may be applied on a block-by-block basis. For example, an input signal may be segmented into a number of different consecutive signal portions or blocks and the transform operation may comprise a matrix multiplication (i.e., linear transformation) that is applied to data from each of these blocks (e.g., as represented by a 1D vector). In this description and in the art, a transform operation may be said to result in a set of values for a predefined number of data elements, e.g. representing positions in a resultant vector following the transformation. These data elements are known as transformed coefficients (or sometimes simply "coefficients").

In the present examples, user data is embedded within at least one of the above-described transformed coefficients. In particular, user data is embedded by partitioning a set of bits that represent a value of a transformed coefficient. This is shown in FIG. 1.

In the example of FIG. 1, the first sub-layer 103 further comprises a userdata pre-processor 160. The userdata pre-processor 160 is configured to obtain values for custom data to include in the encoded data stream that is communicated between the encoder 105 and the decoder 106. The term "user data" is used herein to refer to any data that does not form the values of the transformed coefficients, i.e. that does not form part of the signal data itself. User data may comprise metadata, contextual data, additional parameters that are not supported by a standardised syntax specification, watermarking data, etc. Although user data may be thought of as independent of the signal data, it may relate to the signal data, e.g. comprise tags or annotations for particular portions of the signal data. User data may also be used to provide signalling for custom "out-of-standard" processing operations at one or more of the encoder 105 and the decoder 106. The userdata pre-processor 160 outputs user data in the form of a set of user data bits 162. In FIG. 1, these are received by a userdata insertion component 164 to insert the user data bits 162 into the transformed coefficient data 122. The userdata insertion component 164 may insert the user data bits 162 by shifting coefficient bits and then copying the values for the user data bits 162 into the bits added by the shift. This may be performed, for example, in relation to transformed coefficient values for a colour component plane of a video signal. The userdata insertion component 164 may comprise a userdata interface to obtain the userdata bits 162 representing custom data to add to the encoded signal bitstream. The userdata bits 162 are combined with the set of first sub-layer transformed coefficients 122 and are encoded by the first sub-layer bitstream encoding component 124 to form part of the first sub-layer encoded bitstream 126. As such, the userdata insertion component 164 may comprise a bitstream encoding interface to output a modified set of coefficient bits as generated by the userdata insertion component 164 for generation of an encoded bitstream.

At the decoder 106, the decoded set of first sub-layer transformed coefficients 130 contains the user data. The first sub-layer 103 further comprises a userdata extraction component 168 to extract the user data bits 170. The user data bits 170 may be extracted from the added bits as described above and then the userdata extraction component 168 may apply a further bit shift operation, where the further bit shift operation is in a direction that is opposite to the direction used for the bit shift applied by the userdata insertion component 164. In FIG. 1, the extracted userdata bits 170 are received by a userdata post-processor 172 communicatively coupled to the userdata extraction component 168 to obtain userdata bit values from the extracted userdata bits 170 and to derive custom data values from the bit values, i.e. to reconstruct the custom data that was originally received by the userdata pre-processor 160 at the encoder 105. The extraction of the userdata bits 170 modifies the decoded set of first sub-layer transformed coefficients 130, which may then be further decoded, e.g. by applying an inverse transform operation at the first sub-layer inverse transformation and inverse quantisation component 132.

Hence, by additionally including the userdata insertion and extraction components 164 and 168, a signal coding system 101 that uses a standardised coding approach (such as LCEVC) may be adapted to additionally encode user data within a communicated bitstream. As the bitstream encoding and decoding may be lossless operations, e.g. as compared to a quantisation operation performed by transform and quantisation components 120 and 140, the userdata values may be encoded for communication without modifying the values that are to be extracted by the decoder 106. As the userdata bits are associated with values of transformed coefficients they may also be associated with particular blocks of signal data, whereby userdata may be assigned to addressable portions of the signal and so at the decoder 106 user data values may be linked to corresponding portions of a decoded signal reconstruction, such as different areas of a frame of a video signal.

Figure 2:
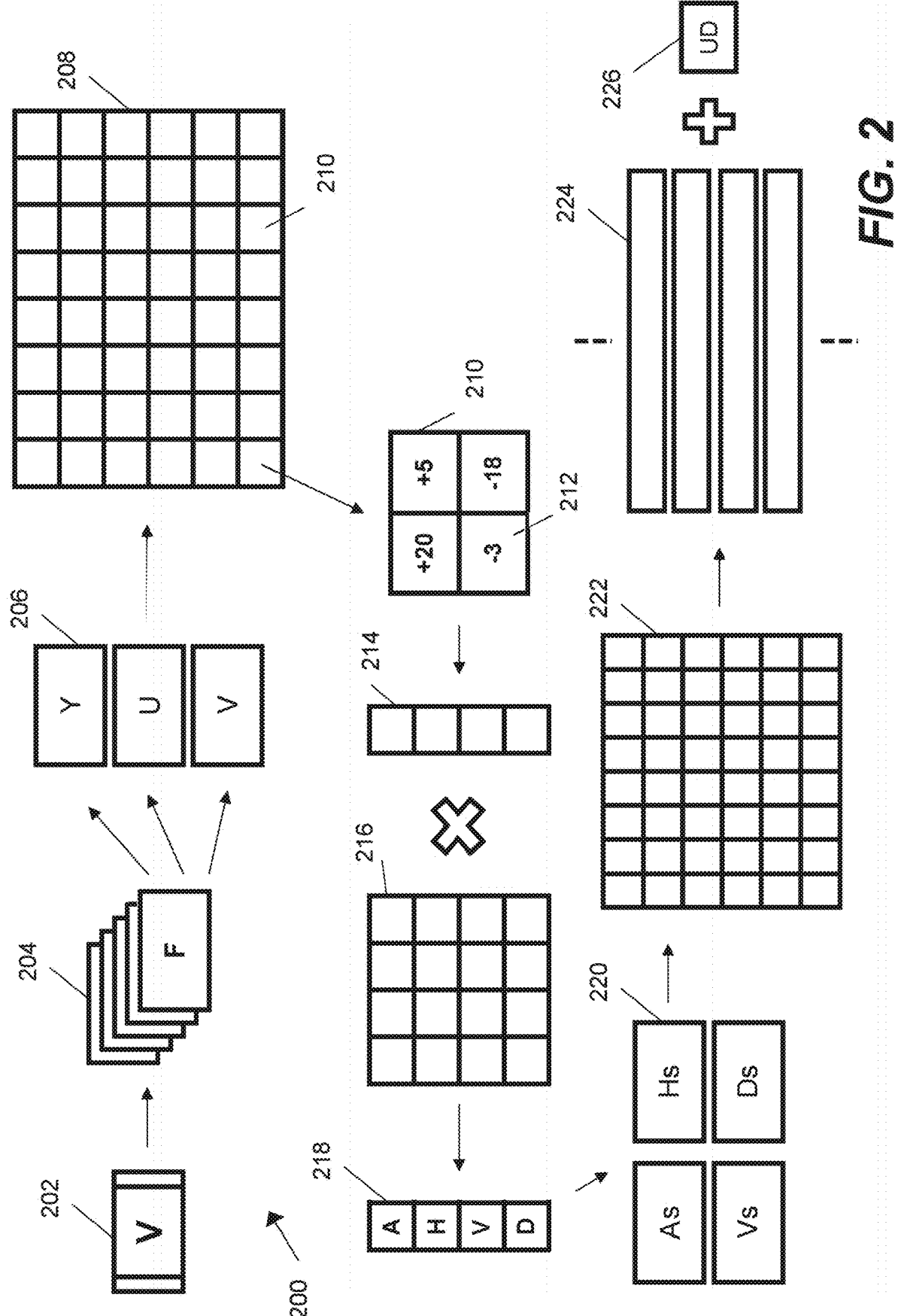
FIG. 2 is a schematic diagram showing an example encoding of video data.

FIG. 2 shows a video coding example 200 that provides further explanation of what is meant by transformed coefficients and how these relate to an original input signal.

In the example of FIG. 2, a video signal 202 is encoded. The video signal 202 comprises a plurality of frames or pictures 204, e.g. where the plurality of frames represent action over time. In this example, each frame 204 is made up of three colour components. The colour components may be in any known colour space. In FIG. 2, the three colour components are Y (luma), U (a first chroma opponent colour) and V (a second chroma opponent colour). Each colour component may be considered a plane 208 of values. The plane 208 may be decomposed into a set of n by n blocks of signal data 210. For example, in LCEVC, n may be 2 or 4; in other video coding technologies n may be 8 to 32.

In LCEVC and certain other coding technologies, a video signal fed into a base layer such as 101 is a downscaled version of the input video signal 202. In this case, the signal that is fed into both sub-layers comprises a residual signal comprising residual data. A plane of residual data may also be organised in sets of n by n blocks of signal data 210. The residual data may be generated by comparing data derived from the input signal being encoded, e.g. the video signal 202, and data derived from a reconstruction of the input signal, the reconstruction of the input signal being generated from a representation of the input signal at a lower level of quality. In the example of FIG. 1, the reconstruction of the input signal may comprise a decoding of the encoded base bitstream 112 that is available at the encoder 105. This decoding of the encoded base bitstream 112 may comprise a lower resolution video signal that is then compared with a video signal downsampled from the input video signal 202. The comparison may comprise subtracting the reconstruction from the downsampled version. The comparison may be performed on a frame-by-frame (and/or block-by-block) basis. The comparison may be performed at the first level of quality; if the base level of quality is below the first level of quality, a reconstruction from the base level of quality may be upscaled prior to the comparison. In a similar manner, the input signal to the second sub-layer, e.g. the input for the second sub-layer transformation and quantisation component 140, may comprise residual data that results from a comparison of the input video signal 202 at the second level of quality (which may comprise a full-quality original version of the video signal) with a reconstruction of the video signal at the second level of quality. As before, the comparison may be performed on a frame-by-frame (and/or block-by-block) basis and may comprise subtraction. The reconstruction of the video signal may comprise a reconstruction generated from the decoded decoding of the encoded base bitstream 112 and a decoded version of the first sub-layer residual data stream. The reconstruction may be generated at the first level of quality and may be upsampled to the second level of quality.

Hence, a plane of data 208 for the first sub-layer 103 may comprise residual data that is arranged in n by n signal blocks 210. One such 2 by 2 signal block is shown in more detail in FIG. 2 (n is selected as 2 for ease of explanation) where for a colour plane the block may have values 212 with a set bit length (e.g. 8 or 16-bit). Each n by n signal block may be represented as a flattened vector 214 of length $n^2$ representing the blocks of signal data. To perform the transform operation, the flattened vector 214 may be multiplied by a transform matrix 216 (i.e. the dot product taken). This then generates another vector 218 of length $n^2$ representing different transformed coefficients for a given signal block 210. FIG. 2 shows an example similar to LCEVC where the transform matrix 216 is a Hadamard matrix of size 4 by 4, resulting in a transformed coefficient vector 218 having four elements with respective values. These elements are sometimes referred to by the letters A, H, V and D as they may represent an average, horizontal difference, vertical difference and diagonal difference. Such a transform operation may also be referred to as a directional decomposition. When n=4, the transform operation may use a 16 by 16 matrix and be referred to as a directional decomposition squared.

As shown in FIG. 2, the set of values for each data element across the complete set of signal blocks 210 for the plane 208 may themselves be represented as a plane or surface of coefficient values 220. For example, values for the "H" data elements for the set of signal blocks may be combined into a single plane, where the original plane 208 is then represented as four separate coefficient planes 222. For example, the illustrated coefficient plane 222 contains all the "H" values. These values are stored with a predefined bit length, e.g. a bit length B, which may be 8, 16, 32 or 64 depending on the bit depth. A 16-bit example is considered below but this is not limiting. As such, the coefficient plane 222 may be represented as a sequence (e.g. in memory) of 16-bit or 2-byte values 224 representing the values of one data element from the transformed coefficients. These may be referred to as coefficient bits. In the present examples, these form the first sub-layer transformed coefficients 122 that are modified to include userdata bit 226. This is explained in further detail below.

In one case, one data element in the set of transformed coefficients, i.e. one particular coefficient, is selected to carry user data. This data element may be selected based on experiments and/or visual perception. For example, it has been found that a horizontal element (referred to as "H" for a 2 by 2 Hadamard transform and "HH" for a 4 by 4 Hadamard transform) may be modified to carry user data with a reduced amount of visually perceived change in a reconstruction generated with the first sub-layer encoded data stream. Moreover, in a case where the two sub-layers are used as shown in FIG. 1, and where those sub-layers represent residual data, the residual data of the second sub-layer, e.g. 104 in FIG. 1, may correct any visual changes in a reconstruction at the first level of quality, and thus provide lossless encoding. In practice, it has been found that even with lossy encoding, embedding the user data within transformed coefficients at the first sub-layer produces little change in the reconstruction at the first level of quality. This is at least in part because bits that carry values for the transformed coefficients are partitioned such that an approximation to an original value is still communicated to the decoder as well as the user data: in many cases, this approximation is "good enough" and generates an output that cannot be visually distinguished with the naked eye.

Figures 3A, 3B:
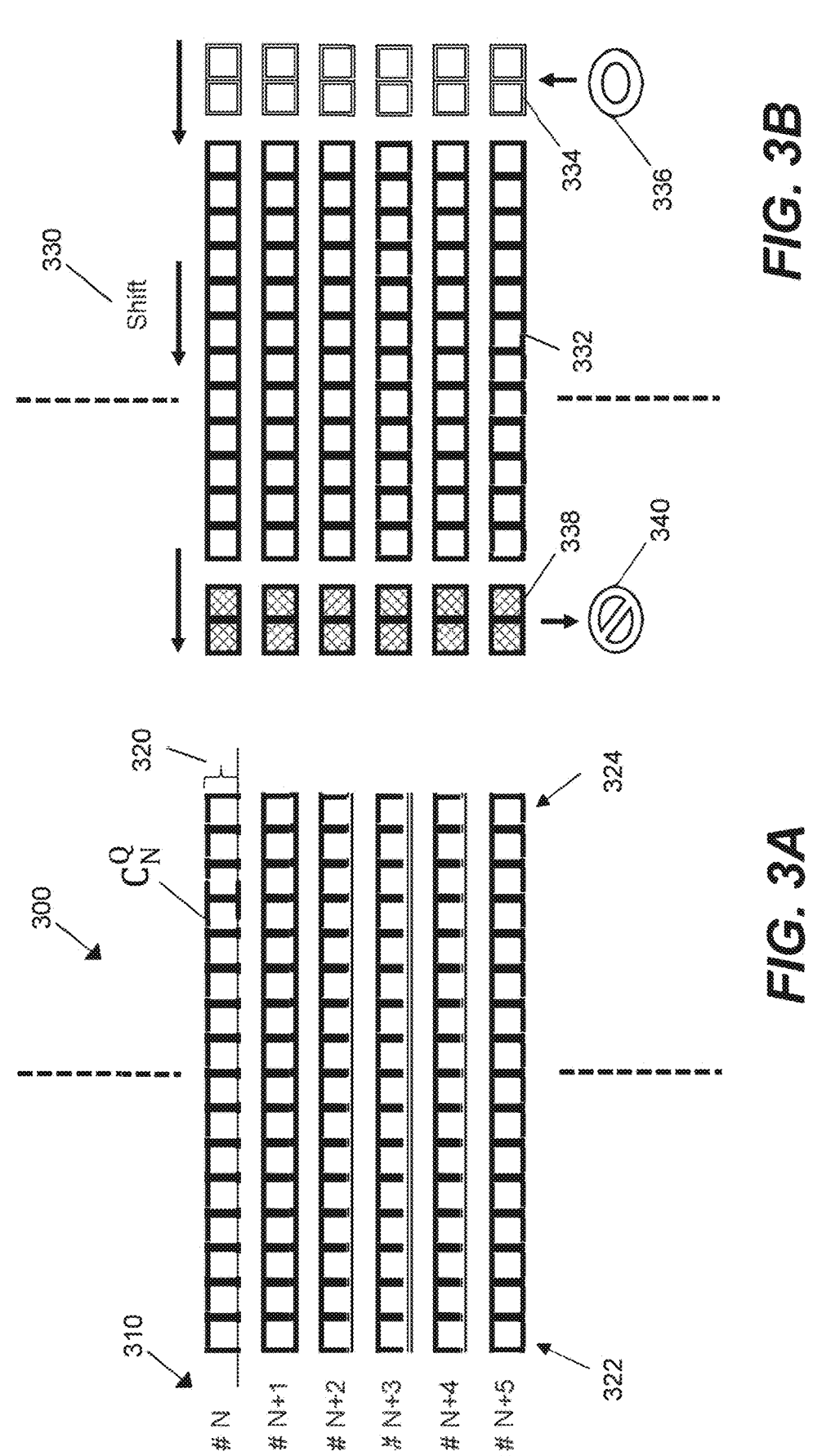
FIGS. 3A to 3C are schematic diagrams showing an example process of user data insertion.
Figure 3C:
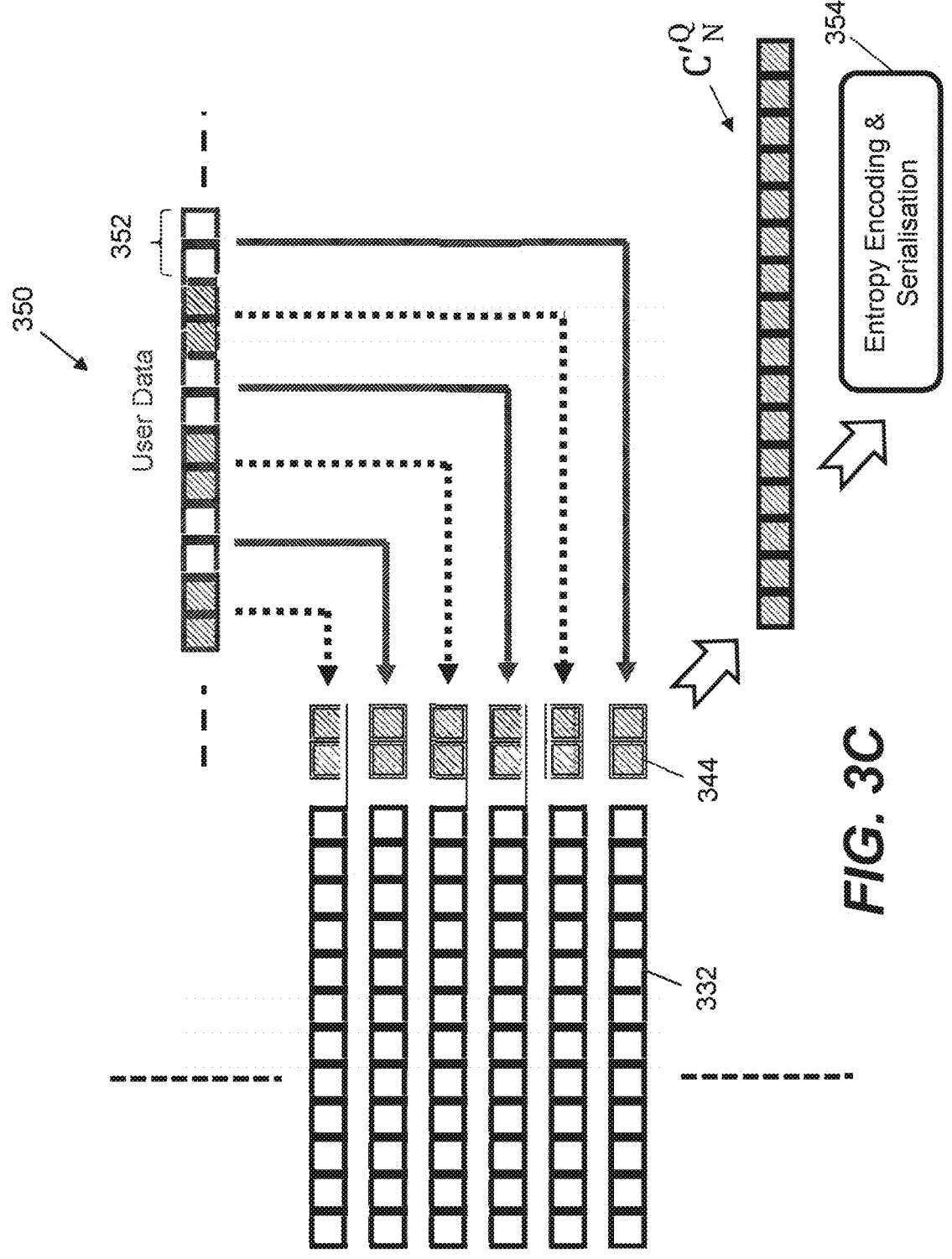

FIGS. 3A to 3C show one example method of inserting user data that may be implemented by the userdata insertion component 164 of FIG. 1.

FIG. 3A shows a set of coefficient bits 300 representing values for a set of transformed coefficients 310, the values being generated by applying at least a transform operation to blocks of signal data derived from an input signal being encoded. For example, the set of coefficient bits 300 may comprise the sequence of B-bit values 224 as shown in FIG. 2. In the examples of FIGS. 3A to 3C and 4A to 4C, the values are represented by 16-bits and there are thus 16 bits per value, as represented by row 320. The set of transformed coefficients 310 may correspond to all data elements output by a transform (e.g., A, H, V and D) or a subset of those data elements (e.g., just H).

In FIG. 3B, a bit shift operation 330 is applied to the coefficient bits 300 to allow the insertion of the user data. In FIG. 3A, the sequence of coefficient bits has two ends 322 and 324. One of these ends is "shifted out" by the bit shift operation. In one case, the end 322 comprises the most significant bit and the bit shift operation 330 is a left shift. This has the effect of moving the values for a central set of bits 332 a number of places in the direction of the shift. For a left shift, it is equivalent to multiplying the coefficient value by 2" where D is the length of the bit shift. The bit shift operation 330 may be configured by a parameter that indicates the size of D. In FIG. 3B, the bit shift operation 330 is a shift of 2 bits to the left. The size of the bit shift operation 330 also indicates a number of bits that are available to carry the user data. In FIG. 3B, the two most significant bits 338 are shifted out of the coefficient bits and are thus discarded 340. The bit shift operation 330 acts to add or insert a number of additional bits 334, where the number depends on the size of the bit shift. In this case, two additional bits 334 are added to the least significant bit of the set of coefficient bits. In the present example, these two additional bits 334 have a value of zero 336. They thus represent blank bits whose value may be set with userdata bits. This is shown in FIG. 3C.

In FIG. 3C, the values of the additional bits 334 are set based on a set of obtained userdata bits 350. As shown in FIG. 3C, the values of the central 14 bits 332 are unaltered but the values of the additional bits 334 are set as shown by 344 with respective bit values from the userdata bits 350. In this example, the userdata bits 350 are arranged as groups of bits, where each group of bits 352 has a length (i.e. a number of bits) that is equal to the size of the bit shift (in other cases it may also be less than the size of the bit shift). In the example of FIG. 2, as two bits are added to end 324 (the least significant bit for a left shift; the most significant bit for a right shift), the userdata bits 350 comprise pairs of bits 352 (i.e. can represent 4 different values—0, 1, 2 or 3). Different values may be added to different coefficient values representing different blocks of signal data; hence, different user data values may be associated with different portions of the signal being encoded. Although userdata bits are shown being added to each coefficient value, in certain cases only a subset of coefficient values corresponding to a subset of particular signal blocks may be modified in this manner.

FIG. 3C shows a modified set of coefficient bits that are then sent for entropy encoding and serialisation 354, e.g. for bitstream encoding using first sub-layer bitstream encoding component 124.

Figure 4A:
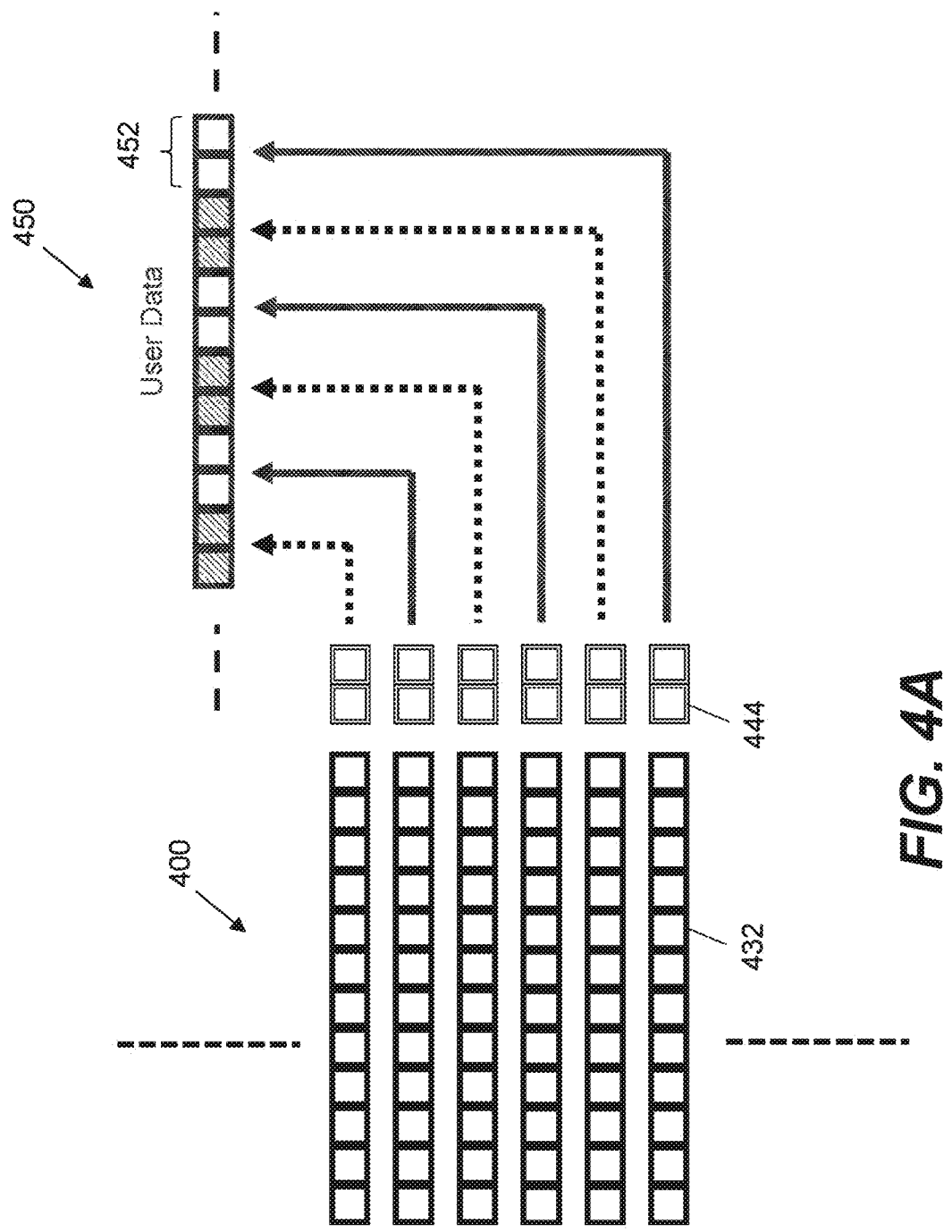
Figures 4B, 4C:
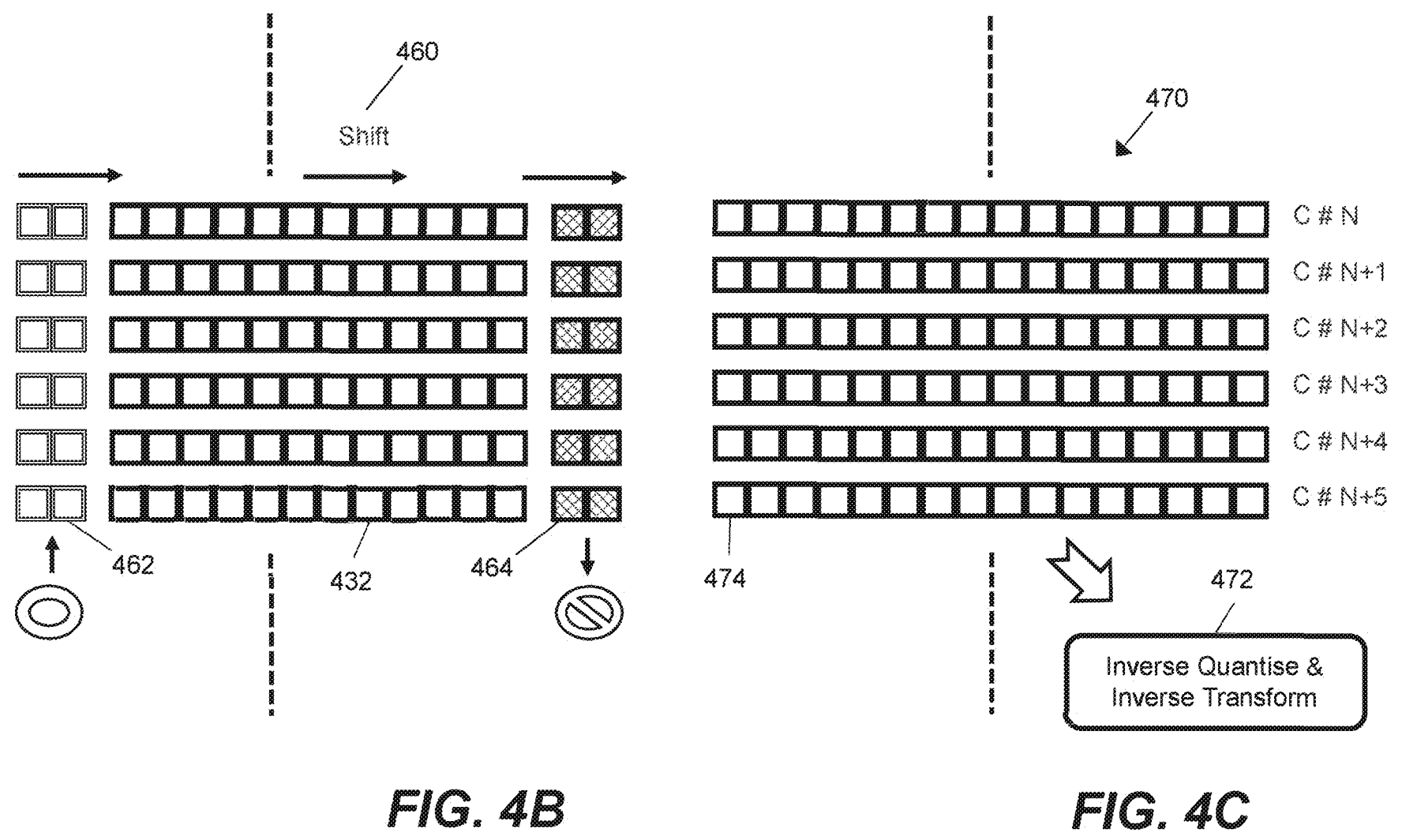

FIGS. 4A to 4C shown an example of a userdata extraction process that may be performed by the userdata extraction component 168 as shown in FIG. 1. In FIG. 4A, an initial set of coefficient bits 400 are obtained. These represent values for a set of transformed coefficients, namely they comprise the input to the entropy encoding and serialisation 354 as shown in FIG. 3C as received and decoded by a decoder. The initial set of coefficient bits 400 may be obtained by decoding an encoded bit stream as explained with reference to FIG. 1 (e.g., decoding the first sub-layer bitstream 126). In FIG. 4A, the userdata bit values that were added to the additional bits 444 are read from those same bits and are used to construct a stream of userdata bits 450 that is a reconstruction of the userdata bits 350 that were embedded in FIG. 3C. This may then be read out as user data 170 in FIG. 1 and post-processed as necessary.

Once the userdata bits have been read and/or copied, the coefficient bits may be shifted back to restore an approximation of the original coefficient bits 300. This is shown in FIG. 4B. In FIG. 4B, a bit shift operation 460 is applied to the initial set of coefficient bits 450. The bit shift operation 460 is in the opposite direction to that applied in FIG. 3B. For example, if the bit shift in FIG. 3B is a left shift, the bit shift in FIG. 4B is a right shift. The bit shift operation 460 shifts out the end bits 464 that contained the user data, i.e. after the user data bit values have been read or copied. The bit values 464 are thus effectively discarded. At the other end of the bit sequence, an additional set of bits 462 are corresponding added to the bit sequence by the bit shift operation 460. These additional bits may be set to 0 (or another default value). Hence, in FIG. 4C, a reconstructed set of coefficient bits 470 are provided that may then be passed for inverse quantisation and/or inverse transformation 472. The reconstructed set of coefficient bits 470 may thus be further decoded, which includes applying at least an inverse transform operation to values represented by the reconstructed set of coefficient bits, this further decoding being part of the process of reconstructing the input signal, e.g. as forms part of a conventional LCEVC decoding.

Although the description above refers to 2 bits being used to carry user data values, and the corresponding bit shift being 2 bits, any predefined number of bits may alternatively be used in implementations. The predefined number of bits may be a configurable parameter, e.g. set by a user_data_size parameter or a user_data_enabled parameter that indicates a predefined size.

Additionally, although the above description refers to a left shift that is performed at the encoder and a right shift that is performed at the decoder, in other implementations this may be reversed and a right shift may be performed at the encoder and a left shift may be performed at the decoder. For example, if the end 322 is the least significant bit then FIG. 3B shows a right shift; if the end 322 is the most significant bit then FIG. 3B shows a left shift. It is important that the corresponding operation at the decoder is a bit shift in the opposite direction to that applied at the encoder. A left shift is preferred if the coefficient values are typically small compared to the bit depth for the coefficient values. For example, if the transformed signal data comprises residual data, the bit depth is 16-bit, and the shift length is 2, a left shift preserves the bit values of coefficient values up to 214. A right shift is preferred if the coefficient values are typically large compared to the bit depth for the coefficient values, e.g.

are non-residual values. A right shift acts to discard small values but maintain an approximate precision of large values. The bit shift may comprise logical shifts such that overflow is ignored. The bit shifts may be implemented in C/C++ using the "<<" (left shift) and ">>" (right shift) operators.

In one case, if a left shift is used and the coefficient value is represented by a signed integer where the most significant bit indicates the sign, then the insertion process may include additional steps to maintain the sign value. In this case, prior to the bit shift operation 330 in FIG. 3B, the sign bit (the most significant bit) may be copied. A left shift of one may then be performed prior to the bit shift operation 330 and the sign bit value used to set the value of the bit added by the shift. The operation of FIG. 3B may then be performed. At the decoder, after the user data has been extracted and the first right shift has been performed as shown in FIG. 4B, the least significant bit value, carrying the sign bit value, may be read and stored in temporary memory. The reconstructed coefficient bits resulting from FIG. 4B may then be further right shifted by 1 and the sign bit value may be restored to the most significant bit 474 (e.g. by setting this value to the buffered sign bit value). This approach may allow sign information to be maintained at the cost of a further shift operation; however, small values stored within the non-altered (B—D—1) core bits 332/432 may be maintained. It should be noted that in other examples the sign bit may also be added after adding the userdata bits at the encoder, and removed prior to reading the userdata bits at the decoder.

Performing a left shift at the encoder followed by a right shift at the decoder is equivalent to multiplying the coefficient values by 2" and then subsequently dividing the coefficient values by 2D (or 2 (D+1) if the sign bit method is performed). If the coefficient value is represented by 8-bits and is "7", and D=2, then coefficient bits of 00000111 become 000111xx where xx carries the user data. The restored version of the coefficient value at the decoder is also "7". If the sign bit method is used, the coefficient is "−7" and a most significant bit value of 1 is used to represent negative numbers, then coefficient bits of 10000111 become 00111sxx where xx carries the user data and s=1. The restored version is also "−7". So, for low values, there is no modification of values. However, in effect, both cases act to cap or clip the coefficient value based on the shift length. For example, if the value is 112-01110000, then the left shift and right shift provides an approximation of 48 (01110000>110000xx>00110000) with no sign bit restore and if the value is −112-11110000—an approximation of −16 (11110000>100001xx>10010000).

Performing a right shift at the encoder followed by a left shift at the decoder is equivalent to dividing the coefficient values by 2D (and ignoring the remainder) and then subsequently multiplying the coefficient values by 2D. If the coefficient value is represented by 8-bits and is "7". and D=2, then coefficient bits of 00000111 become xx000001 where xx carries the user data. The restored version of the coefficient value at the decoder is thus 00000100 or 4. If the coefficient is "−7" and a most significant bit value of 1 is used to represent negative numbers, then coefficient bits of 10000111 become xx100001 where xx carries the user data. This results in a restored value of 10000100-"−4". In effect, both of these cases act to round values to a nearest (e.g. nearest lowest) power-of-two multiple. However, if the value is 112-01110000, then the right shift and left shift provides an output of 112 (01110000>xx011100>0011100)

and if the value is −112-11110000—an output of −112 (11110000>xx111100>11110000), i.e. the fidelity of the high values is maintained.

In coding schemes where residual data is computed, such as LCEVC, the combination of left shift at the encoder and right shift at the decoder, has been found to produce better reconstructions; the effect of the capping is better corrected by an upper level of quality and if only one coefficient is modified (e.g. H or HH), this produces little perceivable difference even in a reconstruction using the base layer decoding and the residual data from the first sub-layer. This is because residual values have a distribution around 0, with high values being unlikely. Hence, a combination of left shift at the encoder and right shift at the decoder is preferred for residual data encodings such as LCEVC.

Although the example of FIGS. 3A to 3C shows a set of blank bits being added and the bit values for these bits being subsequently set, it will be noted that this may alternatively be performed by arranging a longer bit sequence with the user data bits to the right of the end bits and then left shifting that longer bit sequence such that the userdata bits are automatically copied across to the end of the coefficient bits. Similarly, although a shift by two bits is shown, the shift may be a configurable amount. For example, a configuration 2 bit flag may be set that indicates four different options for the bit shift size—00 or 0 for no userdata: 01 or 1 for a 2 bit shift and userdata size: 10 or 2 for a 6 bit shift and userdata size; and 11 or 3 for a further custom size. In other cases, the size of the bit shift and the userdata may be set by an integer value that is less than the bit size used to represent the coefficient values.

The size of the user data may indicate a partitioning of the values in the set of transformed coefficient values 300. The original B coefficient bits (where B=16 in FIG. 3A) may be split into two portions: a first portion of C bits to carry a representation of the transformed coefficient value (e.g., where C is less than 16) and configuring a second portion of D bits to carry a user data value (e.g., where D=B−C). The value of D may change dynamically during encoding of an encoded signal stream. For example, if there is network congestion that reduces a bit rate available for the second sub-layer 104, it may be desired to reduce D such that the capping and/or rounding of the coefficient values is reduced in severity, as there may be less ability to correct any effects using the encoded data stream for the second sub-layer 104. In general, methods presented herein may be considered a method of embedding user data in an encoded data stream, where the method comprises: obtaining a set of transformed coefficient values, each value in the set being represented with B coefficient bits; obtaining a set of user data for embedding into the encoded data stream; partitioning, for each value in the set of transformed coefficient values, the B coefficient bits into two portions, including configuring a first portion of C bits to carry a representation of the transformed coefficient value and configuring a second portion of D bits to carry a user data value; and encoding the partitioned B coefficient bits into the encoded data stream, wherein a decoder is able to receive the encoded data stream, decode the partitioned B coefficient bits, extract the set of user data from the second portion of D bits and use the first portion of C bits to generate a reconstruction of the transformed coefficient value. For example, an equivalent decoding method may comprise: receiving the encoded data stream; decoding the partitioned B coefficient bits; extracting the set of user data from the second portion of D bits; and using the first portion of C bits to generate a reconstruction of the transformed coefficient value.

The pre-processing of the userdata, e.g. as performed by userdata pre-processor 160 may comprise obtaining a list of values that have corresponding locations within the signal, e.g. as represented by an x, y co-ordinate and/or a reference to a particular coding unit in a stream of coding units arranged in a predefined order (such as row-first). It may then convert these values into suitable D bit values (or groups of D bit values across multiple signal blocks) and generate a bitstream of user data such that the D bit values are inserted into the signal blocks corresponding to the defined locations. For example, in a bitstream of user data such as is shown in FIGS. 3C and 4A, "00" may be inserted into the bitstream if no user data is to be embedded.

In certain examples, only a subset of the coefficient values may be modified to insert user data. For example, if there is no user data to be inserted into a transformed coefficient associated with a signal block, then no bit shift operation may be performed for that signal block. A mapping between received custom data and signal blocks may be performed by the signal pre-processor 160 based on received location data (as indicated above). Whether a signal block contains embedded user data may be signalled in a signalling stream where a binary flag is provided for each signal block indicating whether the signal block carries user data or not. This may be used to instruct the bit shift operation at the decoder. In other cases, a global signalling parameter may be set for a plane of data indicating whether the bit shift operation is to be performed for all signal blocks within said plane. A data element within a set of data elements forming the transformed coefficients (e.g. H or HH) may be preset or also defined with a signalled parameter.

As described herein, where the signal data comprises residual data, a reconstructed set of coefficient bits may comprise transformed residual data, and a decoding method may further comprise instructing a combination of residual data obtained from the further decoding of the reconstructed set of coefficient bits with a reconstruction of the input signal generated from a representation of the input signal at a lower level of quality to generate a reconstruction of the input signal at a first level of quality. The representation of the input signal at a lower level of quality may be a decoded base signal (e.g. from base decoder 114) and the decoded base signal may be optionally upscaled before being combined with residual data obtained from the further decoding of the reconstructed set of coefficient bits, the residual data being at a first level of quality (e.g., a first resolution). Decoding may further comprise receiving and decoding residual data associated with a second sub-layer 104, e.g. obtaining an output of the inverse transformation and inverse quantisation component 152, and combining it with data derived from the aforementioned reconstruction of the input signal at the first level of quality. This data may comprise data derived from an upscaled version of the reconstruction of the input signal at the first level of quality, i.e. an upscaling to the second level of quality.

Although examples have been described with reference to a tier-based hierarchical coding scheme in the form of LCEVC, the methods described herein may also be applied to other tier-based hierarchical coding scheme, such as VC-6: SMPTE VC-6 ST-2117 as described in PCT/GB2018/053552 and/or the associated published standard document, which are both incorporated by reference herein.

The extraction of user data may comprise obtaining a parameter indicating a number of bits-D-used for user data values. This parameter may be signalled from the encoder. This may instruct the userdata extraction component 168 to obtain bit values for a set of D bits that are located at one end of the initial set of coefficient bits, the set of D bits being added during the bit shift operation applied at the encoder. In this case, the size of the bit shift operation is set by the number of bits-D-used for user data values The userdata post-processor 172 may post-process the bit values to reconstruct a set of user data values. In certain cases, a portion of user data may be distributed across multiple blocks of signal data (e.g. a byte of user data may be distributed 4 blocks each having a 2-bit user data value). In this case, the userdata pre-processor 160 may split and distribute the bit values of bytes of received custom data and the userdata post-processor 172 may reconstruct the original bytes of custom data based on userdata bit values extracted from multiple signal blocks.

The techniques described herein may be implemented in software or hardware, or may be implemented using a combination of software and hardware. They may include configuring an apparatus to carry out and/or support any or all of techniques described herein.

The above examples are to be understood as illustrative. Further examples are envisaged.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A method of encoding signal data, comprising:
obtaining coefficient bits representing values for a set of transformed coefficients, the values being generated by applying at least a transform operation to blocks of signal data derived from an input signal being encoded;
obtaining userdata bits representing custom data to add to an encoded signal bitstream;
applying a bit shift operation to the coefficient bits, the bit shift operation shifting the coefficient bits by a predefined number of bits;
setting values of a set of additional bits added to the coefficient bits based on the userdata bits to generate a modified set of coefficient bits;
instructing generation of an encoded bitstream using the modified set of coefficient bits, wherein:
the encoded bitstream carries both the custom data and an encoding of the signal data,
the blocks of signal data comprise residual data generated by comparing data derived from the input signal being encoded and data derived from a reconstruction of the input signal, the reconstruction of the input signal being generated from a representation of the input signal at a lower level of quality, and
the encoded bitstream is an encoded enhancement bitstream for a first enhancement sub-layer at a first level of quality;
obtaining further coefficient bits representing values for a set of transformed coefficients at a second level of quality, the second level of quality being higher than the first level of quality, the values being generated by applying at least a transform operation to blocks of signal data at the second level of quality;
instructing generation of an encoded enhancement bitstream for a second enhancement sub-layer at the second level of quality using the further coefficient bits without applying a bit shift operation;

obtaining a parameter indicating a bit length for user data values, the bit length indicating the predefined number of bits for the bit shift operation; and
pre-processing the custom data to generate a bitstream of custom data values, each value being represented in the bitstream by a group of bits of the bit length.

2. The method of claim 1, comprising:
prior to obtaining the coefficient bits:
obtaining the blocks of signal data derived from an input signal being encoded; and
applying the transform operation to data from each of the blocks of signal data to generate initial transformed coefficients; and quantizing the initial transformed coefficients to generate the set of transformed coefficients.

3. The method of claim 1, further comprising:
encoding the modified set of coefficient bits using one or more of entropy encoding and run-length encoding to generate the encoded bitstream.

4. The method of claim 1, wherein the representation of the input signal at the lower level of quality comprises a representation of the input signal at a lower resolution.

5. The method of claim 4, wherein the encoded bitstream is an encoded enhancement bitstream to enhance an encoded base bitstream, the encoded base bitstream being an encoded representation of the input signal at a lower level of quality.

6. The method of claim 1, wherein the blocks of signal data comprise n by n blocks of signal data, and the transform operation implements a matrix multiplication applied to flattened vectors of length $n^2$ representing the blocks of signal data and wherein the matrix multiplication comprises a multiplication with an $n^2$ by $n^2$ Hadamard matrix.

7. The method of claim 1, wherein the transform operation outputs values for a set of data elements for each block of signal data, and the coefficient bits represent transformed coefficient values for a predefined one of the set of data elements.

8. The method of claim 1, wherein the custom data comprises data associated with defined specific locations with the input signal, and wherein the method comprises:
pre-processing the custom data to assign custom data values to specific blocks of the signal data based on the defined specific locations with the input signal,
wherein applying the bit shift operation and copying the userdata bits 1s performed for at least the specific blocks of the signal data.

9. An encoder configured to perform the method according to claim 1.

10. A method of decoding signal data, the method comprising:
obtaining an encoded bitstream;
decoding the encoded bitstream to obtain an initial set of coefficient bits representing values for a set of transformed coefficients, the values being generated during encoding by applying at least a transform operation to blocks of signal data derived from an input signal;
extracting userdata from a set of end bits of the initial set of coefficient bits, wherein extracting the userdata comprises:
obtaining a parameter indicating a number of bits used for user data values;
obtaining bit values for a set of bits that are located at one end of the initial set of coefficient bits, the set of bits being added during a bit shift operation applied during encoding; and post-processing the bit values to reconstruct a set of user data values, wherein the size of the bit shift operation is set by the number of bits used for the user data values;

applying the bit shift operation to the initial set of coefficient bits, the bit shift operation being in a direction that is opposite to a direction of a bit shift operation applied during encoding, the bit shift operation generating a reconstructed set of coefficient bits;

instructing further decoding of the reconstructed set of coefficient bits, the further decoding comprising applying at least an inverse transform operation to values represented by the reconstructed set of coefficient bits, wherein the further decoding is used to generate a reconstruction of the input signal, wherein the reconstructed set of coefficient bits comprise transformed residual data;

instructing a combination of residual data obtained from the further decoding of the reconstructed set of coefficient bits with a reconstruction of the input signal generated from a representation of the input signal at a lower level of quality to generate a reconstruction of the input signal at a first level of quality, wherein the encoded bitstream is an encoded enhancement bitstream for a first enhancement sub-layer at the first level of quality; and obtaining an encoded enhancement bitstream for a second enhancement sub-layer at a second level of quality;

decoding, without applying a bit shift operation and extracting user data, the encoded enhancement bitstream for the second enhancement sub-layer to obtain a second set of residual data for the second level of quality;

instructing a combination of the second set of residual data with a reconstruction at the second level of quality derived from the reconstruction of the input signal at the first level of quality to generate a reconstruction of the input signal at the second level of quality.

11. The method of claim 10, wherein decoding the encoded bit stream comprises one or more of entropy decoding and run-length decoding and wherein further decoding of the reconstructed set of coefficient bits comprises applying an inverse quantization operation prior to the inverse transform operation.

12. The method of claim 10, wherein the encoded bitstream is an encoded enhancement bitstream to enhance an encoded base bitstream, the reconstruction of the input signal being derived from a decoding of the encoded base bitstream.

13. The method of claim 10, wherein the transform operation outputs values for a set of data elements for each block of signal data, and the coefficient bits represent transformed coefficient values for a predefined one of the set of data elements.

14. The method of claim 13, wherein the initial set of coefficient bits represent values for the predefined one of the set of data elements for different n by n blocks of signal data, and the inverse transform operation implements a matrix multiplication applied to vectors of the set of data elements to regenerate the blocks of signal data and wherein the matrix multiplication comprises a multiplication with an $n^2$ by $n^2$ Hadamard matrix.

15. The method of claim 14, comprising:

associating extracted userdata with specific locations in the reconstruction of the input signal based on the location of the blocks of signal data with respect to the input signal, wherein the bit shift operation applied to the initial set of coefficient bits is a right shift.

16. The method of claim 10, wherein the input signal comprises a video signal, and the method is applied for blocks of data for at least one color plane associated with frames of the video signal.

17. A decoder configured to perform the method according to claim 10.

* * * * *